(12) United States Patent
Bacher et al.

(10) Patent No.: US 9,053,053 B2
(45) Date of Patent: Jun. 9, 2015

(54) EFFICIENTLY DETERMINING IDENTICAL PIECES OF MEMORY USED BY VIRTUAL MACHINES

(75) Inventors: Utz Bacher, Boeblingen (DE); Einar Lueck, Boeblingen (DE); Stefan Raspl, Boeblingen (DE); Thomas Spatzier, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 13/292,187

(22) Filed: Nov. 9, 2011

(65) Prior Publication Data
US 2012/0137045 A1    May 31, 2012

(30) Foreign Application Priority Data
Nov. 29, 2010 (EP) .................................... 10192880

(51) Int. Cl.
G06F 21/00 (2013.01)
G06F 12/10 (2006.01)

(52) U.S. Cl.
CPC ........ *G06F 12/109* (2013.01); *G06F 2212/151* (2013.01); *G06F 2212/656* (2013.01); *G06F 2212/657* (2013.01)

(58) Field of Classification Search
CPC .................................................... G06F 12/109
USPC ............................................................ 711/6
See application file for complete search history.

(56) References Cited

U.S. PATENT DOCUMENTS

| | | | | |
|---|---|---|---|---|
| 4,742,450 A | * | 5/1988 | Duvall et al. | 719/310 |
| 4,758,951 A | * | 7/1988 | Sznyter, III | 711/206 |
| 4,991,082 A | * | 2/1991 | Yoshizawa et al. | 711/209 |
| 5,095,420 A | * | 3/1992 | Eilert et al. | 711/209 |
| 5,129,070 A | * | 7/1992 | Dorotte | 711/209 |
| 5,319,758 A | * | 6/1994 | Arai et al. | 711/209 |
| 5,826,057 A | * | 10/1998 | Okamoto et al. | 703/24 |

(Continued)

OTHER PUBLICATIONS

"Memory Resource Management in VMware ESX Server", Carl A. Waldspurger, ACM SIGOPS Operating Systems Review—OSDI '02: Proceedings of the 5th symposium on Operating systems design and implementation Homepage archive, vol. 36 Issue SI, Winter 2002, pp. 181-194 (14 pages).*

(Continued)

*Primary Examiner* — Sanjiv Shah
*Assistant Examiner* — Daniel C Chappell
(74) *Attorney, Agent, or Firm* — Steven Chiu, Esq.; Blanche E. Schiller, Esq.; Heslin Rothenberg Farley & Mesiti P.C.

(57) ABSTRACT

Efficiently determining identical pieces of memory within a computer memory area, which is occupied by a virtual machine manager hosting multiple guests and the computer memory area being logically separated into memory pages of a unique size. Each guest is inspected for its structural characteristics by the virtual machine manager. The structural characteristics of each guest are compared by the virtual machine manager, wherein memory regions of guests having a similar structure are identified; and the identical memory pages are identified by the virtual machine manager by comparing hash values of memory pages located within memory regions of guests having a similar structure, wherein identical memory pages are determined by comparing hash values calculated over the contents of the memory pages.

23 Claims, 2 Drawing Sheets

(56) References Cited

U.S. PATENT DOCUMENTS

| | | | |
|---|---|---|---|
| 6,075,938 A * | 6/2000 | Bugnion et al. | 703/27 |
| 6,134,601 A * | 10/2000 | Spilo et al. | 719/328 |
| 6,549,996 B1 * | 4/2003 | Manry et al. | 711/203 |
| 6,785,886 B1 * | 8/2004 | Lim et al. | 718/1 |
| 6,789,156 B1 * | 9/2004 | Waldspurger | 711/6 |
| 7,356,665 B2 * | 4/2008 | Rawson, III | 711/202 |
| 7,472,252 B2 * | 12/2008 | Ben-Zvi | 711/203 |
| 7,500,048 B1 * | 3/2009 | Venkitachalam et al. | 711/6 |
| 7,620,766 B1 * | 11/2009 | Waldspurger | 711/6 |
| 7,680,919 B2 | 3/2010 | Nelson | |
| 7,702,843 B1 * | 4/2010 | Chen et al. | 711/6 |
| 7,716,667 B2 | 5/2010 | van Rietschote et al. | |
| 7,734,893 B2 | 6/2010 | Hattori et al. | |
| 7,984,304 B1 * | 7/2011 | Waldspurger et al. | 713/187 |
| 8,074,047 B2 * | 12/2011 | Abali et al. | 711/206 |
| 8,190,827 B2 * | 5/2012 | Eidus et al. | 711/148 |
| 8,234,655 B2 * | 7/2012 | Corry et al. | 719/312 |
| 8,244,957 B2 * | 8/2012 | Eidus et al. | 711/6 |
| 8,261,267 B2 * | 9/2012 | Iwamatsu et al. | 718/1 |
| 8,392,914 B2 * | 3/2013 | Kang | 718/1 |
| 8,458,434 B2 * | 6/2013 | Pfeffer et al. | 711/203 |
| 8,463,980 B2 * | 6/2013 | Post et al. | 711/6 |
| 8,499,114 B1 * | 7/2013 | Vincent | 711/6 |
| 8,533,711 B2 | 9/2013 | Heim | |
| 8,572,623 B2 | 10/2013 | Bhogal et al. | |
| 8,613,080 B2 | 12/2013 | Wysopal et al. | |
| 8,706,947 B1 * | 4/2014 | Vincent | 711/6 |
| 8,909,845 B1 * | 12/2014 | Sobel et al. | 711/6 |
| 8,938,572 B1 * | 1/2015 | Vincent | 711/6 |
| 2003/0070057 A1 * | 4/2003 | Kakeda et al. | 711/207 |
| 2003/0177332 A1 * | 9/2003 | Shiota | 711/203 |
| 2004/0024953 A1 * | 2/2004 | Babaian et al. | 711/6 |
| 2004/0143720 A1 * | 7/2004 | Mansell et al. | 711/206 |
| 2007/0006178 A1 * | 1/2007 | Tan | 717/136 |
| 2007/0283348 A1 | 12/2007 | White | |
| 2008/0147956 A1 * | 6/2008 | Rawson | 711/6 |
| 2008/0263258 A1 | 10/2008 | Allwell et al. | |
| 2009/0089781 A1 | 4/2009 | Shingai et al. | |
| 2009/0204718 A1 * | 8/2009 | Lawton et al. | 709/230 |
| 2009/0282481 A1 * | 11/2009 | Dow et al. | 726/23 |
| 2010/0030998 A1 | 2/2010 | Kiriansky | |
| 2010/0057881 A1 | 3/2010 | Corry et al. | |
| 2010/0082922 A1 | 4/2010 | George et al. | |
| 2010/0161908 A1 * | 6/2010 | Nation et al. | 711/147 |
| 2011/0131568 A1 | 6/2011 | Heim | |
| 2011/0214122 A1 | 9/2011 | Lublin et al. | |
| 2011/0214123 A1 | 9/2011 | Lublin et al. | |
| 2012/0131259 A1 * | 5/2012 | Baskakov et al. | 711/6 |
| 2012/0137291 A1 | 5/2012 | Bacher et al. | |

OTHER PUBLICATIONS

Increasing memory density by using KSM, Arcangeli et al, OLS '09: Proceedings of the Linux Symposium (Jul. 13-17, 2009), pp. 19-28 (12 pages).*

Satori: Enlightened page sharing, Milos et al, USENIX ATC '09, 2009 (14 pages).*

Definition heuristics, Jun. 2007, retrieved from http://searchsoftwarequality.techtarget.com/definition/heuristics on Jun. 14, 2014 (1 page).*

Definition of "operating system", Free Online Dictionary of Computing, Jun. 9, 1999, retrieved from http://foldoc.org/operating+system on Jun. 4, 2014 (1 page).*

Memory Resource Management in VMware ESX Server, Carl A. Waldspurger, ACM SIGOPS Operating Systems Review—OSDI '02: Proceedings of the 5th symposium on Operating systems design and implementation Homepage archive, winter 2002, pp. 181-194 (14 pages).*

Arcangeli et al., "Increasing Memory Density by Using KSM," Proceedings of the Linux Symposium, Jul. 2009, pp. 19-28.

Pfoh et al., "A Formal Model for Virtual Machine Introspection," MCSec '09, Nov. 2009, pp. 1-9.

"Secure Virtualization in Cloud Computing," Jul. 2010, pp. 1-2.

Milos et al., "Satori: Enlightened Page Sharing," University of Cambridge Computer Laboratory, Cambridge, United Kingdom, Apr. 2009, pp. 1-23.

Scarfone et al., "Guide to Security for Full Virtualization Technologies," Jul. 2010, pp. 1-18.

"Effective Enterprise Java Virtualization with Oracle WebLogic Suite," An Oracle White Paper, Apr. 2010, pp. 1-13.

Hyser et al., "Automatic Virtual Machine Placement in the Data Center," HP Laboratories, Dec. 2007, pp. 1-10.

Clark et al., "Live Migration of Virtual Machines," NSDI '05: 2nd Symposium on Networked Systems and Design & Implementation, Jun. 2005, pp. 273-286.

Bacher et al., "Placing a Virtual Machine on a Target Hypervisor," U.S. Appl. No. 13/292,324, filed Nov. 9, 2011.

Bacher et al., Office Action for U.S. Appl. No. 13/292,324, filed Nov. 9, 2011 (U.S. Patent Publication No. 2012/0137291 A1), dated Feb. 12, 2014 (11 pages).

Final Office Action for U.S. Appl. No. 13/292,324 dated Jul. 29, 2014, 20 pages.

* cited by examiner

EFFICIENTLY DETERMINING IDENTICAL PIECES OF MEMORY USED BY VIRTUAL MACHINES

PRIOR FOREIGN APPLICATION

This application claims priority from European patent application number 10192880.2, filed Nov. 29, 2010, which is hereby incorporated herein by reference in its entirety.

BACKGROUND

One aspect of the present invention relates to efficiently determining identical pieces of memory within a computer memory area.

Virtualization is becoming more and more important in IT architectures and allows the use of central servers for performing different tasks as required by a user. Such a server comprises a computer as known in the art which has a virtual machine manager, also called a hypervisor, running thereon. The virtual machine manager can be running directly on the hardware of the computer, which means without an external operating system, or as an application within a standard operating system like Linux, Windows, or others. Also virtual machine managers running on an intermediate abstraction layer are known in the art.

The hypervisor is a virtualization software that provides an environment for running virtual machines, which are also called guests. These guests are virtual instances of operating systems, which are encapsulated inside the virtual machine manager and can be executed like running directly on a computer hardware.

Accordingly, each virtual machine running within the hypervisor requires the same amount of memory as being running directly on the computer. With multiple guests running within the hypervisor, the required overall amount of memory increases rapidly. Therefore, virtualization requires the use of a huge amount of a computer memory, e.g. a RAM, which is cost-intensive and thereby limits the number of virtual machines which can be run on a single piece of hardware.

To increase the efficiency of virtualization, it is desired to reduce the amount of memory used by the guests. One idea to achieve this goal is to identify memory regions which store identical information and to replace repeated occurrences of the same memory contents with just a link to another appearance of the memory contents. Such an idea was realized with "Kernel Samepage Mapping" (KSM), which is known from the Linux operating system. The memory used by the different virtual machines is analyzed in pieces of memory pages of a certain size, e.g. 4 kB, by first calculating a hash value over each memory page, ordering the hash values of each virtual machine and comparing the hash values of different virtual machines. Occurrences of identical hash values indicate identical memory pages, so called samepages, so that one of these memory pages can be replaced by a reference to the other. Since virtual machines and applications/processes running on a virtual machine have a dynamic behavior and can be started and stopped at any time, this process of identifying samepages has to be performed continuously. Accordingly, the calculation of the hash values and the comparison require a huge computational effort and reduces available capacity of the resources of the computer. Hashing is a method known to a person skilled in the art and is therefore not further explained.

Improvements have been realized by solutions that are managed by an administrator to identify memory ranges with an increased likelihood for encountering samepages. This has the drawback that a permanent attention of the administrator is required due to the dynamic behavior of the guests.

Another approach for improvement is described in the paper "Increasing Memory Density by using KSM" by Andrea Arcangeli et al., presented at the Linux Symposium on Jul. 13 to 17, 2009 in Montreal, Quebec, Canada, and hereby incorporated herein by reference in its entirety. To reduce the required computational effort for identifying samepages, processes have the option to register which areas of the memory occupied by them should be scanned. This is not transparent at all and requires that the application running on a guest and furthermore the guest itself have such a feature implemented, which prevents that legacy applications/guests benefit from efficient Samepage Mapping. Some operating systems, that are most frequently run directly on a computer hardware, e.g. operating systems are designed to be used by home users, will probably not provide such a feature.

BRIEF SUMMARY

In one aspect, a method is provided that includes inspecting each guest for its structural characteristics by the virtual machine manager; comparing the structural characteristics of each guest by the virtual machine manager, whereby memory regions of guests having a similar structure are identified; and identifying the identical memory pages by the virtual machine manager by comparing hash values of memory pages located within memory regions of guests having a similar structure.

In a further aspect, a computer-readable medium such as a storage device, a floppy disk, CD, DVD, Blue Ray disk, or a random access memory (RAM), containing a set of instruction that causes a computer to perform one or more aspects of the above method is provided. In a yet further aspect, a computer program product including a computer usable medium including computer usable program code is provided, wherein the computer usable program code is adapted to execute one or more aspects of the above method.

BRIEF DESCRIPTION OF THE SEVERAL VIEWS OF THE DRAWINGS

One or more embodiments of the invention are illustrated in the accompanied figures. These embodiments are merely exemplary, i.e. they are not intended to limit the content and scope of the appended claims.

DETAILED DESCRIPTION

One aspect of the invention is to make an automatic introspection of the different virtual machines to limit the memory pages to be scanned. The introspection can in a very simple case be based on information provided from a virtual machine to the virtual machine manager, e.g. when a virtual machine registers to a hypervisor. In other cases such an introspection can be based on an analysis of the amount of memory which is used by a virtual machine or the way of use of the memory. This enables to identify memory pages with contents, which does not frequently change, compared to memory pages containing frequently changing data. Such quasi static memory pages are more likely for finding samepages within different virtual machines, since they probably contain system components and/or applications, whereas working data, which can frequently be loaded into the computer memory and be discarded after use, probably varies from application to application. Application is here used as a general term for a piece of software which at runtime can comprise multiple processes executed within the virtual machine.

Figure 1:
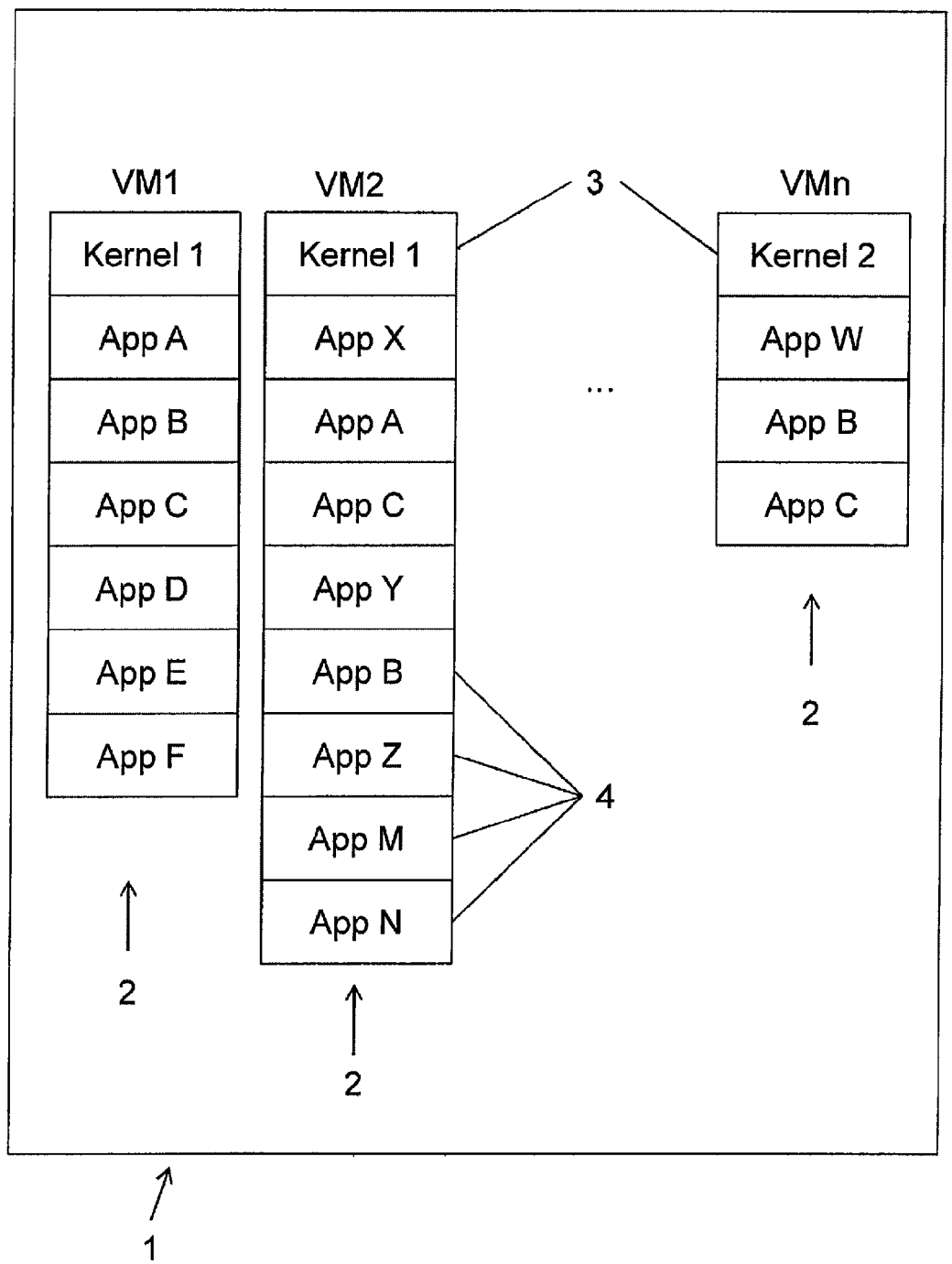
FIG. 1 shows a diagram with a virtual machine manager and different virtual machines running thereon.

Referring now to FIG. 1, a virtual machine manager or hypervisor 1 is shown, which is running on a not specifically shown computer. The computer can be a standard PC or a dedicated server, depending on the required resources and is known to a person skilled in the Art. The hypervisor 1 can be executed immediately on a hardware of the computer, as an application of an operating system or on an intermediate abstraction layer there between. The general behavior of the hypervisor 1 is not affected by the system or the software surrounding it.

Within the hypervisor 1 a number of guests 2 or virtual machines are executed, from which the virtual machines VM1, VM2 and VMn are presently shown. Each guest 2 comprises an operating system kernel 3, which depends on the operating system used by the guest 2. In the hypervisor 1 shown in FIG. 1, VM1 and VM2 have the same operating system and accordingly use the same kernel 3, whereas VMn has a different operating system running and therefore uses a different kernel 3.

Each guest 2 is executing different applications 4, as shown in FIG. 1. VM1 executes App A to App F, whereas on VM2 App A to App C, App X to App Z, App M and App N are executed. VMn executes App B, App C and App W. Although the shown applications 4 appear in rectangular boxes of the same size, this does not indicate a certain memory use of kernels 3 and/or applications 4. Also the amount of memory available for each guest 2 is not indicated by the number of shown boxes. An Application 4 is here used as a general term for a piece of software which at runtime can comprise multiple processes executed within the guest 2.

Figure 2:
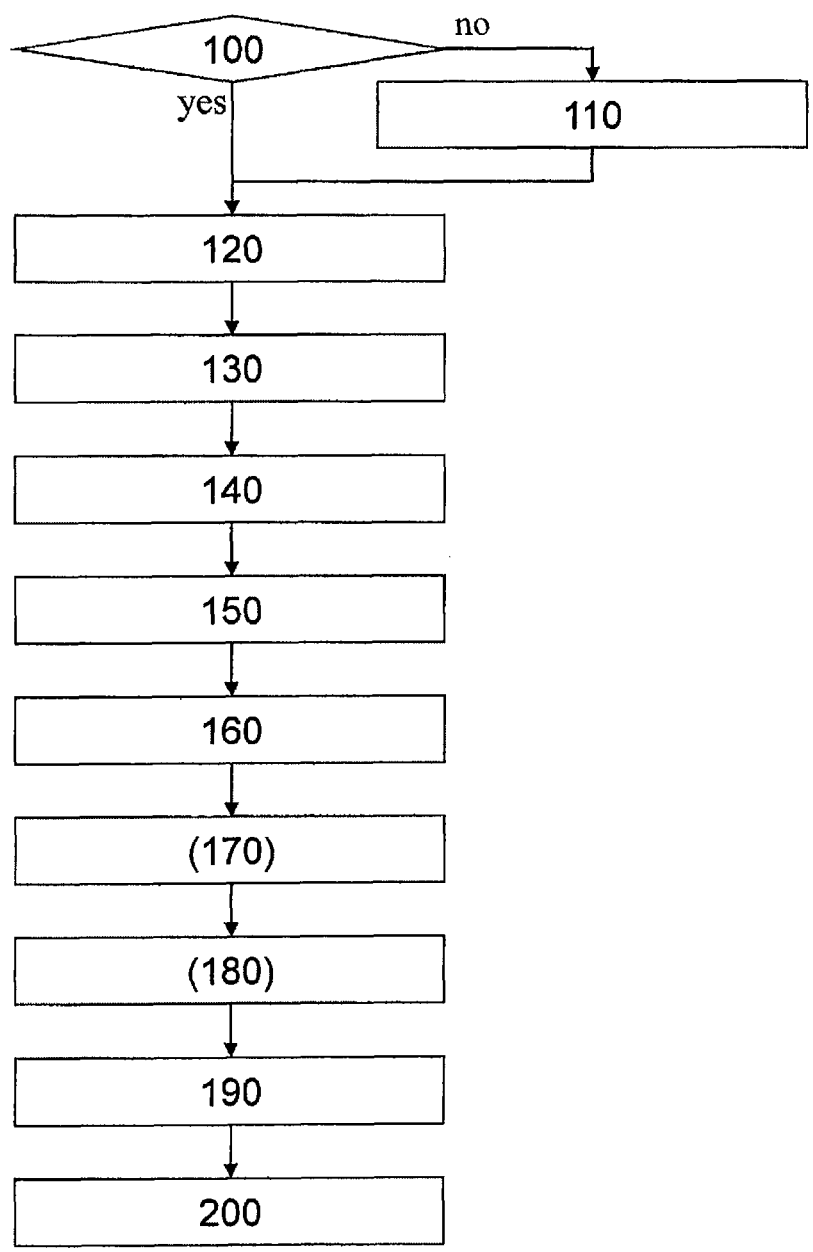
FIG. 2 shows a flowchart of the method for determining identical pieces of memory according to an embodiment of the present invention.

Now referring to FIG. 2, a method for identifying samepages is shown. The method starts in step 100 and determines, if a kernel symbol table and a structure type information are provided by the user. In a Linux operating system, this information is contained in the "System.map" and the structure type information is specified in a "kerntype"-file object. The "System.map" contains meta-information about the used processes and allocated areas of the memory. In other operating systems this information is contained in different structures and file objects, which can nevertheless be provided and accessed by the hypervisor 1. If this information is already provided by a user, the method continues with step 120.

In step 110 the hypervisor 1 determines by its own the kernel system table and the structure type information from the guest 2. It is already explained for the Linux Operating System, this information is available from the file "System.map", which can be searched within the respective guest 2. The kernel version can be identified by looking-up a kernel version identifier and comparing it with known reference values.

In step 120 the hypervisor attaches to the memory used by the guest. This means that the hypervisor 1 gains direct access to the physical memory assigned to the virtual machine 2, which allows a further introspection of the virtual machine 2.

By directly accessing the guest memory, in step 130 a list of processes running on the virtual machine 2 is investigated. This can be done by accessing a linked list of tasks structures, which is e.g. used by a task manager within a multitasking operating system. Similar techniques are used by tools like the Linux Kernel Crash Dump (LKCD) utility.

In step 140, for all tasks of the task list a process name is identified and a virtual memory descriptor of that task is assigned. In the Linux operating system, the virtual memory descriptor would be the "mm"-pointer, a pointer to the memory maps. This allows the hypervisor 1 to assign processes and the memory used by these processes and to obtain a full list of the memory used by a guest 2.

According to step 150, libraries of each task of the task list are identified and physical pages of the memory maps for the libraries of these tasks are identified. This yields to a list of physical pages of a library. A similar processing technique is known from tools like the GNU debugger (gdb).

Introspection is further detailed in step 160, where for all tasks of the task list physical pages are identified, which contain BSS (Block started by symbol), text and optionally data segments. Each type of memory usage is combined in a list of physical pages for BSS, text and optionally data segments of each task.

In optional step 170, the kernel symbol table is used to identify page tables for kernel memory. The pages contained in these tables are inserted into a list of physical pages contained in these page tables.

In step 180, which is also optional, the kernel symbol table is used to identify page cache entries. Based on files, which are specified by their file names, a list of physical pages for page cache entries is created.

Based on the introspection of the virtual machines 2 from the preceding steps, in step 190 all memory pages identified during the introspection and added to the respective lists are hashed. The result of the hashing process is a hash value for each memory page, which is added into the respective list containing the hashed memory page and linked to this memory page.

Finally, in step 200, memory pages of two guests are compared for potential samepage mapping. This step comprises the identification of the kernel 3 of the two guests 2 to identify, if a comparison of the memory pages of the respective guests 2 has chances of success. If the comparison of two virtual machines 2 is promising, a comparison is performed in detail based on the above lists. In the example shown in FIG. 1, VM1 and VM2 have the same kernel 3 so that these guests 2 are considered for detailed comparison of memory pages. As can be seen in FIG. 1, multiple applications 4 are being executed on VM1 and VM2. According to the idea of introspection, samepages are most likely to be found for memory pages assigned to applications 4, which are running on both VM1 and VM2. Accordingly, when the respective processes are identical, e.g. when the process name is identical for the two guests 2, the pages of process text segments, pages of process BSS segments and optionally pages of process data segments are respectively compared. Also, pages of library lists are compared, when the library name is identical for the two guests 2. Optionally, pages of page tables for kernel memory can be compared and also optionally page cache pages can be compared, when they belong to an identical filing and path.

The comparisons of step 200 can be executed in any order. The order of the comparison given here is chosen just as an example without limiting the scope of the present invention.

Samepages identified within the two guests 2 can then be passed to a samepage mapping mechanism, to enable the hypervisor 1 to reuse samepages in one of the guests 2 by providing a link to the respective samepage at the other guest 2.

The above comparison of guests 2 is performed pair wise for VM1 to VMn. As can be seen in FIG. 1, VMn uses a different kernel 3 compared to VM1 or VM2. If the structure of the respective kernels 3 is completely different, no detailed comparison of the memory pages of VM1 and VM2 with VMn has to be performed, since also the applications 4 will be different. If the structure of the respective kernels 3 is similar, at least for the kernel 3 no detailed comparison of the memory pages of VM1 and VM2 with VMn has to be performed, although applications 4 can be similar and compared for occurrences of samepages. If the kernels 3 of VM1 and VM2 only differ in service level and not in the type of Operating System from the kernel 3 of VMn, memory pages belonging to applications 4 and optionally memory pages belonging to the Operating System can be compared.

One aspect of the present invention relates to efficiently determining identical pieces of memory within a computer memory area, which is occupied by a virtual machine monitor hosting multiple guests and the computer memory area being logically separated into memory pages of a unique size, whereby identical memory pages are determined by comparing hash values calculated over the contents of the memory pages. Another aspect also relates to a computer-readable medium such as a storage device, a floppy disk, CD, DVD, Blue Ray disk, or a random access memory (RAM), containing a set of instructions that causes a computer to perform a method according to one or more aspects of the above method. Further, another aspect relates to a computer program product comprising a computer usable medium including computer usable program code, wherein the computer usable program code is adapted to execute one or more aspects of the method.

One or more aspects of the present invention provide a method and a computer program product for identifying identical pieces of memory within a computer memory area, which is occupied by a virtual machine monitor hosting multiple guests, which is powerful and easy to use without the need for human attention.

In one embodiment of the present invention, inspecting the guest for its structural characteristics comprises evaluating an Operating System type of the guest. The Operating Systems themselves have different structures so that the probability for samepages within the Operating Systems is low. Also Different Operating Systems are usually requiring the use of specifically adopted applications so that within these applications the probability for finding samepages amongst virtual machines using different operating systems is rather low.

In one embodiment of the present invention, inspecting the guest for its structural characteristics comprises evaluating used processes, libraries and/or kernel structures. The probability of finding samepages within identical processes, libraries or kernel structures of different virtual machines is increased, since they are based on the same software package and will behave similarly.

In one embodiment of the present invention, inspecting the guest for its structural characteristics comprises evaluating meta-information provided for an operating system of each guest, especially an Operating System version information. Evaluating such information allows to automatically considering structural differences between different versions of same Operating System type. Also variations, e.g. from a 32 bit operating system to a 64 bit operating system can be taken into account. Such meta-information can also be contained in more global information, for example the Suse Linux Enterprise server installations SLES11 GA and SLES11 SP1 contain a changed kernel version, which has not to be considered for samepage mapping. Nevertheless, even with modified kernel versions, the applications running on such kernels of versions can contain samepages, so that comparisons of these applications can still be carried out.

According to one embodiment of the present invention, inspecting the guest for its structural characteristics comprises evaluating meta-information provided for an application running on a guest, especially an application version information. Also this meta-information can help to evaluate which memory pages have to be taken into account for searching samepages.

In one embodiment of the present invention the virtual machine manager stores a rate of successfully mapped pages between guests having certain structures and inspecting the guest for its structural characteristics comprises evaluating a rate of successfully mapped pages between different guests. Accordingly, when structural characteristics do not already allow an identification of memory pages with a high probability of finding samepages, respective memory pages can be analyzed for possible samepages, e.g. with the known comparison of the hash values, and the result can be automatically assigned to the structural characteristics of a combination of two guests. Accordingly, the structural characteristics of the two respective guests are stored together with the rate of successfully mapped pages. The results can also be ordered according to the mapping rate to provide a prioritization, so that samepages can first be searched in memory pages with a high probability of having samepages within different guests. The additional analysis is best performed when system resources are not fully occupied by the virtual machines.

In one embodiment of the present invention a mapping history of each guest with its structural characteristics is stored and inspecting the guest for its structural characteristics comprises evaluating the mapping history. Memory pages, which already matched in a previous run of the guest or its applications, will probably match in a next run as well, so that samepages can easily be identified. Searching these previously matching memory pages can therefore be performed with a high priority to make a best use of available resources.

One or more aspects of the present invention can be understood by the following example calculation illustrating savings in computational effort. The calculations are based on the assumption of two systems A and B, whereby system A has 64 GB of virtually memory allocated and five processes running and a system B has 48 GB of virtual memory allocated and 12 processors running. For simplicity reasons it is further assumed that each process uses the same amount of virtual memory. Accordingly, with a typical page size of 4 kB, system A accounts for 16.000.000 pages with 3.2 million pages/process, whereas a system B accounts for 12.000.000 pages with 1.000.000 million pages/process. According to the state of the art without having a prior knowledge about structural characteristics of the processes running on system A and system B and the use of the memory by the different processes, the most obvious way to determine identical memory pages is to compute hash values for each memory page, order the memory pages according to their hash values lexicographically for each virtual machine and to run over the sorted lists. Assuming the use of an efficient quick sort algorithm which needs an average of n log n operations for sorting n elements, a total number of 16.000.000×log 16.000.000+12.000.000×log 12.000.000≈200.000.000 operations for sorting the arrays of a system A and a system B are required. Additionally, a comparison of all memory pages of system A and system B require 16.000.000+12.000.000=28.000.000 compare operations.

Assuming now that introspection of system A and system B identifies three processes on system A similar to five processes on system B and 20% of the process pages being in text segments or otherwise identified as worth while being examined, the number of required operations is significantly reduced. Applying the method according to an aspect of the present invention, all relevant memory pages of a process on system A have to be compared with all relevant memory pages of a similar process on system B. Accordingly, relevant memory pages of each process on system A require 20%×3.200.000×log(20%×3.200.000)≈12.000.000 operations for sort. On system B, for each process a number of 20%×1.000.000×log(20%×1.000.000)=3.500.000 sorting operations are required on a system for each process. The comparison of a process on system A with a process on system B would require 20%×3.200.000+20%×1.000.000=840.000 compare operations per process pair of similar processes.

Overall, the memory pages of three processes on system A and five processes on system B have to be sorted which results in a number of 12.000.000×3+3.500.000×5=53.500.000 sorting operations are required after introspection, which is about a quarter of the sorting operation in the state of the art. Furthermore, the number of compare operations is reduced to 20%×3.200.000×3+20%×1.000.000×5=2.920.000 compare operations are required for determining identical memory pages of system A and system B. This is about 10% of the compare operations required according to the state of the art.

Accordingly, the overall effort for determining identical pieces of memory is reasonably decreased when using one or more aspects of the present invention.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of efficiently determining identical pieces of memory within a computer memory area, which is occupied by a virtual machine manager hosting multiple guests and the computer memory area being logically separated into memory pages of a unique size, said method comprising:
 inspecting, by the virtual machine manager executed by a processor in a computer, each guest for its structural characteristics, wherein each guest comprises a virtual machine comprising a virtual instance of an operating system, wherein the structural characteristics of each guest include at least one of: operating system type, used processes, libraries, kernel structures, meta-information provided for an operating system, or meta-information provided for an application running on a guest;
 comparing, by the virtual machine manager, the structural characteristics of each guest to determine which guests have similar structural characteristics;
 based on the comparing, identifying one or more memory pages located within memory regions of the guests determined to have similar structural characteristics; and
 based on the identifying, identifying, by the virtual machine manager, identical memory pages among the one or more memory pages of the guests determined to have similar structural characteristics, by comparing hash values of the one or more memory pages of the guests determined to have similar structural characteristics.

2. The method of claim 1, wherein the inspecting comprises evaluating an operating system type of a guest.

3. The method of claim 1, wherein the inspecting comprises evaluating at least one of used processes, libraries or kernel structures.

4. The method of claim 1, wherein the inspecting comprises evaluating meta-information provided for an operating system of each guest, including an operating system version information.

5. The method of claim 1, wherein the inspecting comprises evaluating meta-information provided for an application running on a guest, including an application version information.

6. The method of claim 1, further comprising storing, by the virtual machine manager, a rate of successfully mapped pages between guests having similar structural characteristics, and wherein the inspecting comprises evaluating a rate of successfully mapped pages between different guests.

7. The method of claim 1, further comprising storing a mapping history of each guest with its structural characteristics, and wherein the inspecting comprises evaluating the mapping history.

8. The method of claim 1, wherein the inspecting comprises introspecting each guest to obtain a list of memory used by each guest, the introspecting comprising:
 attaching to the memory used by each guest;
 identifying processes run by each guest; and
 identifying memory associated with the processes run by each guest.

9. A computer program product for efficiently determining identical pieces of memory within a computer memory area, which is occupied by a virtual machine manager hosting multiple guests and the computer memory area being logically separated into memory pages of a unique size, said computer program product comprising:
 a non-transitory computer readable storage medium readable by a processing circuit and storing instructions for execution by the processing circuit for performing a method comprising:
  inspecting, by the virtual machine manager executed by a processor in a computer, each guest for its structural characteristics, wherein each guest comprises a virtual machine comprising a virtual instance of an operating system, wherein the structural characteristics of each guest include at least one of: operating system type, used processes, libraries, kernel structures, meta-information provided for an operating system, or meta-information provided for an application running on a guest;
  comparing, by the virtual machine manager, the structural characteristics of each guest to determine which guests have similar structural characteristics;
  based on the comparing, identifying one or more memory pages located within memory regions of the guests determined to have similar structural characteristics; and
  based on the identifying, identifying, by the virtual machine manager, identical memory pages among the one or more memory pages of the guests determined to have similar structural characteristics, by comparing hash values of the one or more memory pages of the guests determined to have similar structural characteristics.

10. The computer program product of claim 9, wherein the inspecting comprises evaluating an operating system type of a guest.

11. The computer program product of claim 9, wherein the inspecting comprises at least one of evaluating used processes, libraries or kernel structures.

12. The computer program product of claim 9, wherein the inspecting comprises evaluating meta-information provided for an operating system of each guest, including an operating system version information.

13. The computer program product of claim 9, wherein the inspecting comprises evaluating meta-information provided for an application running on a guest, including an application version information.

14. The computer program product of claim 9, wherein the method further comprises storing, by the virtual machine manager, a rate of successfully mapped pages between guests having similar structural characteristics, and wherein the inspecting comprises evaluating a rate of successfully mapped pages between different guests.

15. The computer program product of claim 9, wherein the method further comprises storing a mapping history of each guest with its structural characteristics, and wherein the inspecting comprises evaluating the mapping history.

16. The computer program product of claim 9, wherein the inspecting comprises introspecting each guest to obtain a list of memory used by each guest, the introspecting comprising:
 attaching to the memory used by each guest;
 identifying processes run by each guest; and
 identifying memory associated with the processes run by each guest.

17. A computer system for efficiently determining identical pieces of memory within a computer memory area, which is occupied by a virtual machine manager hosting multiple guests and the computer memory area being logically separated into memory pages of a unique size, said computer system comprising:

a memory; and a processor in communications with the memory, wherein the computer system is configured to perform a method, said method comprising:

inspecting, by the virtual machine manager executed by a processor in a computer, each guest for its structural characteristics, wherein each guest comprises a virtual machine comprising a virtual instance of an operating system, wherein the structural characteristics of each guest include at least one of: operating system type, used processes, libraries, kernel structures, meta-information provided for an operating system, or meta-information provided for an application running on a guest;

comparing, by the virtual machine manager, the structural characteristics of each guest to determine which guests have similar structural characteristics;

based on the comparing, identifying one or more memory pages located within memory regions of the guests determined to have similar structural characteristics; and based on the identifying, identifying, by the virtual machine manager, identical memory pages among the one or more memory pages of the guests determined to have similar structural characteristics, by comparing hash values of the one or more memory pages of the guests determined to have similar structural characteristics.

18. The computer system of claim 17, wherein the inspecting comprises evaluating an operating system type of a guest.

19. The computer system of claim 17, wherein the inspecting comprises evaluating at least one of used processes, libraries or kernel structures.

20. The computer system of claim 17, wherein the inspecting comprises evaluating meta-information provided for an operating system of each guest, including an operating system version information.

21. The computer system of claim 17, wherein the inspecting comprises evaluating meta-information provided for an application running on a guest, including an application version information.

22. The computer system of claim 17, wherein the method further comprises storing, by the virtual machine manager, a rate of successfully mapped pages between guests having certain structures, and wherein the inspecting comprises evaluating a rate of successfully mapped pages between different guests.

23. The computer system of claim 17, wherein the inspecting comprises introspecting each guest to obtain a list of memory used by each guest, the introspecting comprising:

attaching to the memory used by each guest;

identifying processes run by each guest; and identifying memory associated with the processes run by each guest.

* * * * *